US006795876B1

(12) United States Patent
Solomon

(10) Patent No.: US 6,795,876 B1
(45) Date of Patent: Sep. 21, 2004

(54) ADAPTIVE READ PRE-FETCH

(75) Inventor: Gary A. Solomon, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 515 days.

(21) Appl. No.: 09/818,951

(22) Filed: Mar. 27, 2001

(51) Int. Cl.$^7$ ................................................ G06F 13/14
(52) U.S. Cl. ........................ 710/34; 710/311; 711/137; 712/207
(58) Field of Search .......................... 710/1, 6, 33, 34, 710/52, 306, 311, 5; 711/213, 137; 712/205, 207, 233, 237

(56) References Cited

U.S. PATENT DOCUMENTS

| | | | | |
|---|---|---|---|---|
| 5,146,578 A | * | 9/1992 | Zangenehpour | ............. 711/137 |
| 5,761,464 A | | 6/1998 | Hopkins | |
| 5,765,213 A | * | 6/1998 | Ofer | ........................... 711/213 |
| 5,768,548 A | | 6/1998 | Young et al. | |
| 5,778,435 A | * | 7/1998 | Berenbaum et al. | ........ 711/137 |
| 5,860,150 A | * | 1/1999 | Chiarot et al. | .............. 711/213 |
| 5,958,040 A | * | 9/1999 | Jouppi | ........................ 712/207 |
| 6,012,106 A | | 1/2000 | Schumann et al. | |
| 6,029,228 A | * | 2/2000 | Cai et al. | ..................... 711/137 |
| 6,085,291 A | * | 7/2000 | Hicks et al. | ................. 711/137 |
| 6,134,643 A | * | 10/2000 | Kedem et al. | ............... 711/213 |
| 6,167,506 A | * | 12/2000 | Witt | ............................ 712/213 |
| 6,195,735 B1 | * | 2/2001 | Krueger et al. | ............. 711/204 |
| 6,401,193 B1 | * | 6/2002 | Afsar et al. | ................. 712/207 |
| 6,496,921 B1 | * | 12/2002 | Arimilli et al. | ............. 712/207 |
| 6,609,168 B1 | * | 8/2003 | Willke, II | .................... 710/110 |
| 6,622,212 B1 | * | 9/2003 | Tetrick | ........................ 711/137 |
| 6,625,696 B1 | * | 9/2003 | Willke, II | .................... 711/137 |

FOREIGN PATENT DOCUMENTS

| | | | | |
|---|---|---|---|---|
| EP | 284100 A2 | * | 9/1988 | ............. G06F/9/38 |
| EP | 0 924 620 | | 6/1999 | |
| JP | 01189728 A | * | 7/1989 | ............. G06F/9/38 |
| JP | 2000187638 A | * | 7/2000 | ........... G06F/13/36 |

OTHER PUBLICATIONS

"Bus Request Update Mechanism to Improve Processor Performance," Aug. 1, 1995, IBM Technical Disclosure Bulletin, p. 261 264.*

* cited by examiner

Primary Examiner—Xuan M. Thai
(74) Attorney, Agent, or Firm—Fish & Richardson P.C.

(57) ABSTRACT

An amount of data to be pre-fetched during read operations is adaptively modified based upon the experience of previous reads. If previous reads were terminated before all the data desired was obtained, subsequent read amounts may be increased. The initial amount of pre-fetched data may be pre-set or modified dynamically.

20 Claims, 2 Drawing Sheets

ADAPTIVE READ PRE-FETCH

FIELD OF THE INVENTION

This disclosure relates to computer read pre-fetch operations.

BACKGROUND OF THE INVENTION

Existing PCI bridges assist in the control of the sequencing of operations and access to computer busses in accordance with the bus specification (such as, for example, PCI Local Bus Specification Rev. 2.2 published by the PCI Special Interest Group). Pre-fetch algorithms are not covered by the PCI specification, but are widely employed by PCI devices to circumvent a fundamental issue with PCI protocol: it does not include a read amount embedded within each transaction. Such PCI devices employ a static read pre-fetch which requests the same amount of information for a particular type of read operation, regardless of the actual demands of the requesting agent. While this constant pre-fetch amount may be adjustable by means of a device specific configuration register, the selected amount is constant and applicable to all requesting agents served in connection with that register. A static pre-fetch amount may result in pre-fetching too much data.

DETAILED DESCRIPTION

Figure 1:
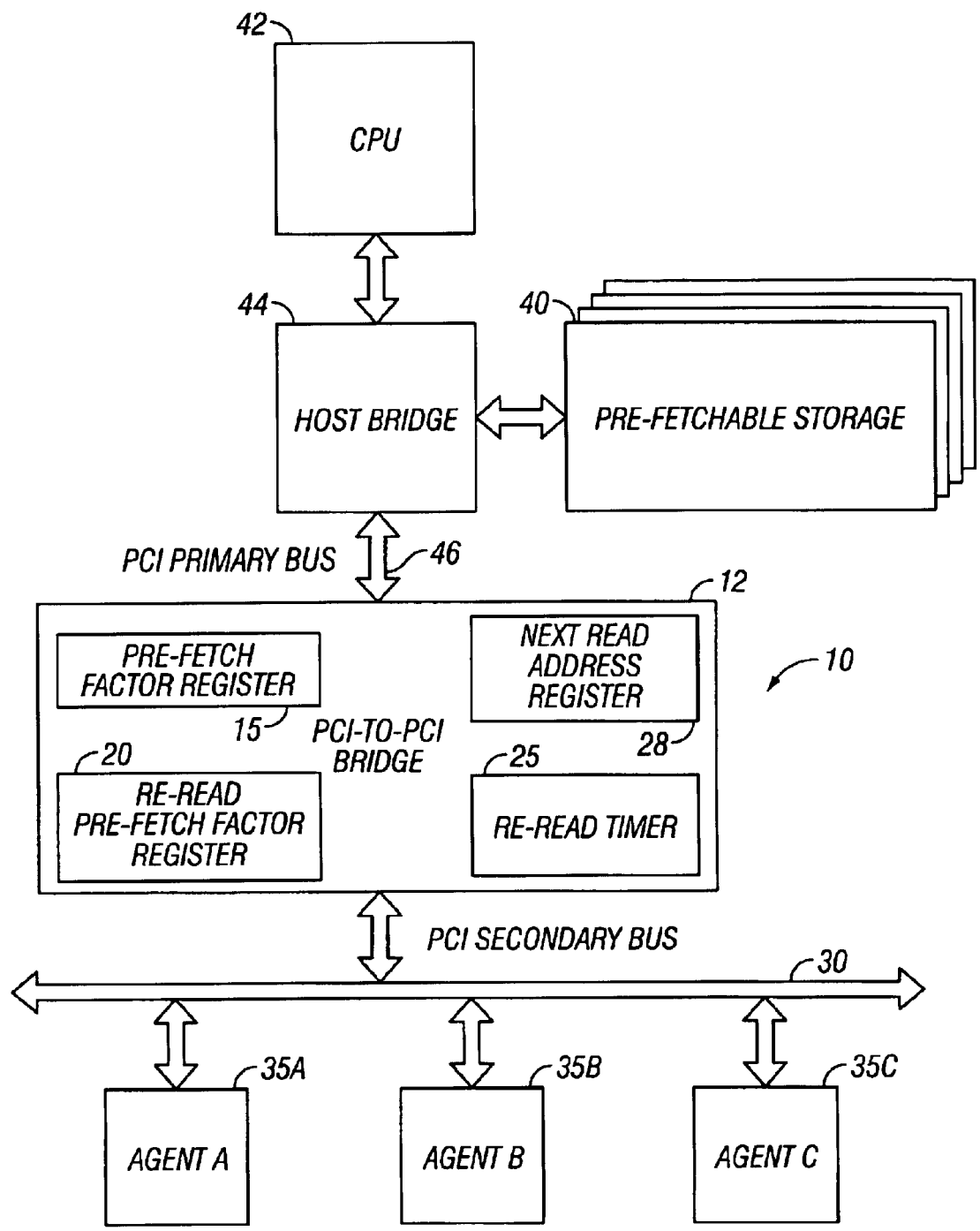
FIG. 1 is a block diagram of an adaptive read pre-fetch system.

Referring to FIG. 1, an example adaptive read pre-fetch system 10 is shown having components on a bridge 12. The components include a pre-fetch factor register 15, being a re-writeable storage location. The adaptive read pre-fetch system 10 also includes a re-read pre-fetch factor register 20, a re-read timer 25 and a next read address register 28. Also shown is pre-fetchable data storage such as system memory 40, and agents 35a, 35b and 35c. Each of the components of the adaptive read pre-fetch system 10 are preferably part of or attached to the computer, such as a bridge 12, within which the pre-fetch factor register 15, the re-read pre-fetch factor register 20, the re-read timer 25, and the next read address register 28 may, but need not, reside. Also shown in FIG. 1 is a CPU 42 which communicates through a host bridge 44 with a PCI primary bus 46. Bridge 12 is also capable of communicating with the primary bus 46.

An agent 35a, 35b or 35c may be any requesting agent, such as an agent on a PCI 2.2 secondary bus 30 connected to a bridge 12. An agent may be any of a number of devices capable of requesting a memory read operation on the bus.

At a set time, typically upon system reset, the values in the pre-fetch factor register 15 and re-read pre-fetch factor register 20 are initialized.

When an agent on the bus 30 requests a memory read operation, it notifies bridge 12 of the request by asserting the appropriate signals on the bus 30. If the bridge 12 determines that the request is for data from pre-fetchable storage 40, it multiplies a pre-defined amount of data requested by the number held in the pre-fetch factor register 15. The amount of data to be read depends upon the type of read request as well as the particular system design, for example the size of a cache line. Table 1 shows the data amounts for three types of read requests. PFFR is the pre-fetch factor register value.

TABLE 1

| Memory Operation | Alignment | Read Size |
| --- | --- | --- |
| Read | DWORD | (PFFR + 1)*4*DWORD |
| Read Line | Cacheline | (PFFR + 1)*cacheline |
| Read multiple | 2 cachelines | (PFFR + 1)*2 cachelines |

A cacheline is a series of contiguous bytes of data corresponding to the host CPU's cache subsystem. Cachelines conform to CPU dependent address alignment. A DWORD is a double word, with a length that depends upon the particular computer memory configuration. Read operations may be limited to cacheline boundaries. Factor is the value contained in the pre-fetch factor register, and may be altered during operation of the computer by software.

Figure 2:
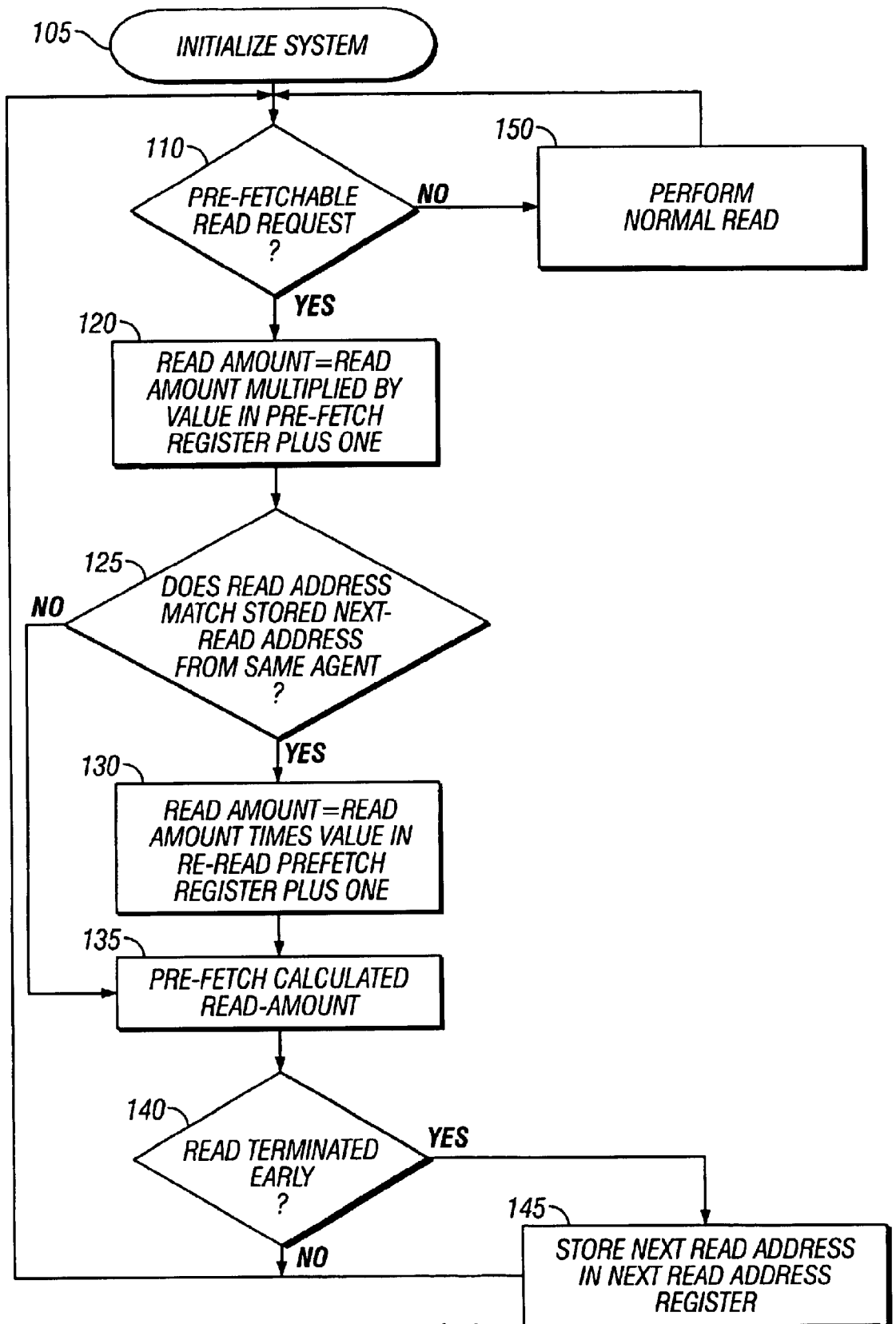
FIG. 2. is a flow chart of an adaptive pre-fetch read method.

Referring to FIG. 2, a flow chart of an adaptive read pre-fetch method 100 is shown. At system initialization 105, an initial value for the pre-fetch factor register is set. This may be in system ROM, or may be set (and changed from time to time) as a parameter by the operating system or any other system or application software. In one embodiment, a pre-fetch timer may be initialized to a set time, which will decrement to zero, unless reset.

If an agent gives a pre-fetchable read request 110 (of whatever type) then the read amount, based upon the type of read, (see table 1) is multiplied by the pre-fetch factor plus one at 120, the pre-fetch factor being stored in the pre-fetch factor register 15. Thus, if the value of the pre-fetch factor register is zero, the read amount is multiplied by one, effectively disabling the feature.

The value in the next read address register 28 is compared to the value of the read address received from the agent at 125. If they are the same (meaning that the value in the next read address was stored as a result of a prior read request from the same agent which was terminated early for some reason, such as being disconnected by the bridge for lack of data), then the read amount is again increased. The read amount is multiplied by one plus the value in the re-read pre-fetch factor register 20 at 130. Other implementations could successively automatically increase the value in the re-read pre-fetch factor register 20 for each early terminated read, and conversely could periodically decrement the re-read pre-fetch factor.

If the address in the read request does not match the value in the next-read address 125, the value in the re-read pre-fetch register is ignored. In either case, the calculated pre-fetch amount is attempted to be read 135.

Table 2 shows the read size for different memory operations using the re-read pre-fetch register (RRPFR) value:

TABLE 2

| Memory Operation | Alignment | Read Size |
| --- | --- | --- |
| Read | DWORD | (PFFR + 1 + RRPFR)*4*DWORD |
| Read Line | cacheline | (PFFR + 1 + RRPFR)*cacheline |
| Read multiple | 2 cachelines | (PFFR + 1 + RRPFR)*2cachelines |

If the read terminates early, then the requesting agent has not received all of the data that it presumably wants. Early termination occurs if the bridge 12 disconnects the read transaction because data is exhausted, and the requesting device is still expecting additional data (i.e. still asserting the PCI bus signal FRAME#.) Data may become exhausted because of a variety of reasons, including an end of file, exhaustion of a buffer or other causes.

In the case of a first early termination, the adaptive read pre-fetch process increases the amount of data retrieved on the next read request at the same location (where the current read ended) from the requesting agent. This is accomplished by saving the next-read address (the next address at which data would have been retrieved had the read not been terminated early) in the Next Read Address Register 28 at 145 and beginning to use the re-read pre-fetch factor and command type specific pre-fetch amounts.

The smart pre-fetch ability may be disabled by programming that is accessible during system initialization and by the operating system as a parameter. A separate process may be implemented for each agent on a secondary bus and may also be implemented in the primary bus side as well as the secondary bus.

The invention has been described in terms of particular embodiments. Other embodiments are within the scope of the following claims. For example, the process may be implemented on a bridge, a separate circuit (discrete or integrated) or in software, or in combinations of software and firmware or circuitry. It may be used successfully in other than a PCI 2.2 bus system. Not all parts of the described embodiment need be implemented to achieve beneficial results.

What is claimed is:

1. A method comprising:
  receiving, from an agent, a request to read data from a read address in pre-fetchable data storage;
  retrieving an initial amount of data determined by a pre-fetch factor;
  terminating the retrieving;
  determining if the requesting agent received as much data as requested when the retrieving is terminated; and
  if the requesting agent did not receive as much data as requested, storing a next read address at which data would have been retrieved, had the retrieving not been terminated
  before said retrieving, comparing the read address to a stored next read address, and if the read address and the stored next read address match, retrieving an amount of data determined by both the pre-fetch factor and a re-read pre-fetch factor.

2. The method of claim 1, wherein said determining includes determining if the retrieving terminated early.

3. The method of claim 1 wherein the value of the pre-fetch factor is alterable.

4. A method comprising:
  receiving, from an agent, a request to read data from a read address in pre-fetchable data storage;
  retrieving an initial amount of data determined by a pre-fetch factor;
  terminating the retrieving;
  determining if the requesting agent received as much data as requested when the retrieving is terminated; and
  if the requesting agent did not receive as much data as requested, storing a next read address at which data would have been retrieved, had the retrieving not been terminated
  changing a the re-read pre-fetch factor based upon the determining.

5. The method of claim 4 further comprising changing the re-read pre-fetch factor after a time interval.

6. The method of claim 4 wherein changing the re-read pre-fetch factor comprises selectively enabling and disabling incrementing the re-read pre-fetch factor.

7. A system comprising:
  a computer having at least one agent, at least one bridge, a pre-fetch factor register, a re-read pre-fetch factor register and a next read address register;
  the bridge being configured to:
    (a) receive from an agent a request to read data from a read address in pre-fetchable data storage;
    (b) read an amount of data determined by a value stored in the pre-fetch factor register;
    (c) determine if the requesting agent has received the full amount of requested data when the read is terminated; and
    (d) if the requesting agent did not receive the full amount of requested data, increment a value in the re-read pre-fetch factor register.

8. The system of claim 7 wherein the bridge is further configured, if the requesting agent did not receive the full amount of requested data, to store a next read address in the next read address register.

9. The system of claim 8, the bridge being further configured to compare the read address to the stored next read address, and if the read address and the stored next read address match, the bridge being further configured to increase the amount of data requested by a value in the re-read pre-fetch factor register.

10. The system of claim 7, the bridge being further configured to change the value in the re-read pre-fetch factor register based upon the determination.

11. The system of claim 7, the bridge being further configured to decrement the pre-fetch factor register after a time interval.

12. The system of claim 7 wherein the contents of the pre-fetch factor register are alterable.

13. The system of claim 7 wherein the bridge is further configured to enable and disable the application of the pre-fetch register and the re-read pre-fetch register under control of the computer.

14. The system of claim 7 wherein the pre-fetch register is contained within the bridge.

15. The system of claim 7 wherein the re-read pre-fetch register is contained within the bridge.

16. A computer program product, disposed on a computer readable medium, comprising instructions to cause a computer to:
  receive from an agent a request to read data from a read address in pre-fetchable data storage;
  read an amount of data determined by a value stored in a pre-fetch factor register;
  determine if the requesting agent has received the full amount of requested data when the read terminates;
  if the requesting agent did not receive the full amount of requested data, store a next read address at which data would have been retrieved had the retrieving not been terminated; and compare the read address to the stored next read address, and if the read address and the stored next read address match, request an amount of data determined by a value in a re-read pre-fetch factor register.

17. The computer program product of claim 16 further comprising instructions causing the computer to decrement the pre-fetch factor register after a time interval.

18. The computer program product of claim 16 wherein the instructions are stored in and implemented by a bridge.

19. A computer program product, disposed on a computer readable medium, comprising instructions co cause a computer to:

receive from an agent a request to read data from a read address in pre-fetchable data storage;

read an amount of data determined by a value stored in a pre-fetch factor register;

determine if the requesting agent has received the full amount of requested data when the read terminates;

if the requesting agent did not receive the full amount of requested data, store a next read address at which data would have been retrieved had the retrieving not been terminated; and causing the computer to increment a re-read pre-fetch factor register based upon the determining.

20. A computer program product, disposed on a computer readable medium, comprising instructions to cause a computer to:

receive from an agent a request to read data from a read address in pre-fetchable data storage;

read an amount of data determined by a value stored in a pre-fetch factor register;

determine if the requesting agent has received the full amount of requested data when the read terminates;

if the requesting agent did not receive the full amount of requested data, store a next read address at which data would have been retrieved had the retrieving not been terminated; and wherein the pre-fetch factor register, a re-read pre-fetch register and the next read address are contained within a bridge.

* * * * *